Sept. 22, 1925.
E. R. BERRY
QUARTZ METAL ARTICLE
Filed Nov. 17, 1923
1,554,703
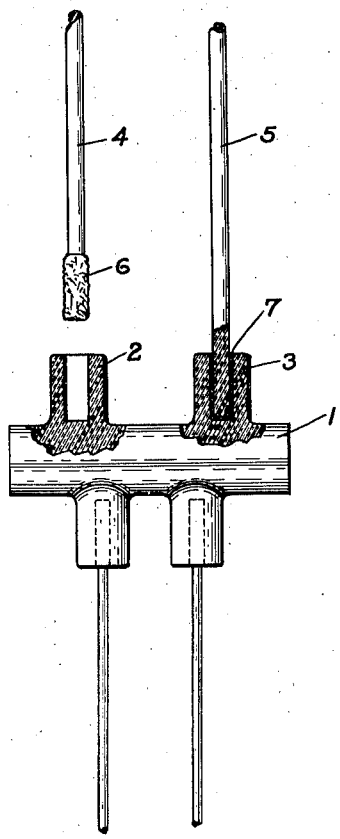
Inventor,
Edward R. Berry,
by
His Attorney.

Patented Sept. 22, 1925.

1,554,703

UNITED STATES PATENT OFFICE.

EDWARD R. BERRY, OF MALDEN, MASSACHUSETTS, ASSIGNOR TO GENERAL ELECTRIC COMPANY, A CORPORATION OF NEW YORK.

QUARTZ-METAL ARTICLE.

Application filed November 17, 1923. Serial No. 675,418.

*To all whom it may concern:*

Be it known that I, EDWARD R. BERRY, a citizen of the United States, residing at Malden, in the county of Middlesex, State of Massachusetts, have invented certain new and useful Improvements in a Quartz-Metal Article, of which the following is a specification.

The present invention relates to the construction of articles consisting partly of quartz and partly of metal as for example, electrical insulators.

Metal parts cannot be inserted into plastic quartz in the same way as they can be inserted into plastic glass due to the fact that metal is not readily "wet" by quartz and also to the high viscosity of the quartz even when highly heated.

In accordance with my invention articles of quartz and metal are joined through the intermediary of a glass which wets both the quartz and the metal. My invention includes both the new product and the new process of making the same.

The accompanying drawing illustrates partly in section a quartz and metal support embodying my invention.

The drawing shows a body of quartz 1, which is provided with off-sets 2, 3 into which metal members 4, 5 are to be sealed. These members may consist of tungsten or molybdenum. Cavities of slightly larger diameter than the metal members 4, 5, are first formed in the quartz by drilling or otherwise. A coating of low expansion glass, as for example, a sodium-magnesium boro-silicate glass is applied upon the wires 4, 5 for example, by dipping into a melted mass of the glass or by applying powdered glass on the surface with water or other suitable binder and then heating to fuse the glass. The coated wire (shown at 6) is inserted into the cavity in the quartz and sufficient heat is applied by a flame to cause the glass to become sufficiently fluid to cement the metal in place as shown at 7.

What I claim as new and desire to secure by Letters Patent of the United States, is:—

1. The method of joining a metal body to a body of quartz of larger size, which consists in forming cavity in said quartz body, larger than said metal body, coating said metal with a glass having a coefficient of expansion intermediate said metal and quartz, inserting the coated body into said cavity and heating to a temperature sufficiently high to seal said metal and quartz to each other.

2. The method of cementing a tungsten wire into a body consisting of fused silica which consists in forming a cavity in said body of greater diameter than said wire, coating said wire with a glass having a coefficient of expansion intermediate tungsten and quartz, and sealing said wire when thus coated into said cavity by fusion.

3. A composite body comprising a silica member having a cavity, a metal member imbedded in said cavity and a layer of glass cementing said metal member to said silica member.

4. A composite article comprising a body of silica having a cavity, a tungsten wire imbedded therein, and a layer of low expansion glass joined by fusion to said silica and tungsten wire.

In witness whereof, I have hereunto set my hand this fifteenth day of November, 1923.

EDWARD R. BERRY.